United States Patent Office 3,381,036
Patented Apr. 30, 1968

3,381,036
DICHLORACETALDEHYDE PROCESS
Benjamin F. Clark, Hamden, Conn., and Joel A. Zaslowsky, Baltimore, Md., assignor to Olin Mathieson Chemical Corporation
No Drawing. Filed May 3, 1966, Ser. No. 547,183
3 Claims. (Cl. 260—601)

This invention relates to an improved process for the preparation of dichloroacetaldehyde. More specifically, it relates to a simplified and economical process for preparing dichloroacetaldehyde without the formation of chloroacetaldehyde and trichloroacetaldehyde as by-products.

Dichloroacetaldehyde is a well-known and widely utilized intermediate in the preparation of insecticides such as 2,2-bis(p-chlorophenyl)-1,1-dichloroethane.

Dichloroacetaldehyde has previously been prepared by the chlorination of acetaldehyde in an aqueous system, as for example disclosed in U.S. Patent 2,552,904. It has also been prepared by the chlorination of chloroacetaldehyde, as disclosed in French Patent 999,412, and diethyl ether, as taught in U.S. Patent 2,697,119.

In the above processes, a mixture of chloroacetaldehyde, dichloroacetaldehyde and trichloroacetaldehyde is obtained. Since these compounds have closely related boiling points (85–6° C., 89.5–90.5° C., and 97.8–98.1° C. respectively), a separation of the mixture by conventional techniques such as distillation is difficult. It is apparent that this drawback results in a commercial process which is unsatisfactory from both an economic and an engineering viewpoint.

The principal object of this invention is to provide an improved process for the preparation of dichloroacetaldehyde which is not subject to the aforementioned disadvantages.

This object has been accomplished in accordance wtih the process of this invention, wherein it has been found that the hypochlorination of dichloroethylene in a dioxane:water system provides good yields of dichloroacetaldehyde without the formation of the mono and trichlorinated homologs. The reaction was surprising and unexpected because it has been found that when an aqueous system is employed, hypochlorination of dichloroethylene yields 1,1,2,2-tetrachloroethane as the major product, with only trace amounts of dichloroacetaldehyde obtained as a by-product. Also, hypochlorination of acetylene in a water:dioxane system produced no detectable dichloroacetaldehyde.

Either trans- or cis-dichloroethylene, or mixtures thereof, may be employed as the starting material. Although a varying amount of chlorine with respect to dichloroethylene may be employed, stoichiometric quantities, that is, a 1:1 molar ratio, are preferred, since excess chlorine tends to convert the product to dichloroacetic acid, while a smaller amount of chlorine results in unreacted dichloroethylene in the reaction mixture.

As previously discussed, a dioxane:water system is an integral part of this process, the water reacting with the chlorine to form hypochlorus acid. Although the proportion of dioxane to water is not critical, sufficient water to form hypochlorus acid must be present. It is particularly advantageous and convenient to employ a dioxane:water mixture containing 2–3:1 by volume of dioxane to water. If the reaction mixture separates into two liquid phases prior to completion of the reaction, an additional quantity of dioxane may be added at the end of the reaction to restore a single phase system and thereby facilitate analysis.

While the reaction proceeds over a temperature range of about 0°–60° C., a preferred range of 0°–20° C. is generally employed.

After the hypochlorination process has been completed, the dichloroacetaldehyde may be isolated by distillation.

The following examples will serve to illustrate the process of this invention.

EXAMPLE 1

Water (100 ml.) and dioxane (300 ml.) were charged into a 500 ml. 3-neck flask equipped with a coarse frit chlorine inlet tube, a reflux condenser, a thermometer and a magnetic stirring bar. The mixture was cooled to 15° C. Chlorine (18 g.) and trans-dichloroethylene (24.3 g.) were then added slowly, in equivalent amounts, over a period of 65 minutes. A temperature of about 17°–19° C. was maintained during the addition. The mixture separated into two liquid phases after approximately 75 percent of the reactants had been added. When the addition was completed, the layers were separated utilizing a separatory funnel.

Samples were taken from both layers and analyzed by vapor phase chromatography on a Perkin-Elmer Model 154 Vapor Fractometer under the following conditions:

Column: 1-meter glass, 4 mm. I.D., 6 mm. O.D.
Packing: 20 percent DC Silicone Oil 200 on Chromosorb
Temperature: 70° C.
Pressure: 10 p.s.i.g. (He)
Voltage: 70 volts injection port voltage A peak at a retention of 12.5 mm. indicated that dichloroacetaldehyde had been obtained. This was confirmed by adding pure dichloroacetaldehyde to the sample, which resulted in an enlargement of the peak at 12.5 mm. The absence of peaks for tetrachloroethane, chloroacetaldehyde and trichloroacetaldehyde proved that these compounds were not by-products of the reaction. The above data showed that the dichloroacetaldehyde was distributed between both layers, but concentrated primarily in the aqueous bottom layer.

A sample from the bottom layer was then tested for derivative formation using 2,4-dinitrophenylhydrazine as the reagent. The 2,4-dinitrophenylhydrazone of dichloroacetaldehyde, melting point 145°–146° C. was formed. Upon the addition of excess 2,4-dinitrophenylhydrazine, a derivative identified as glyoxal bis(2,4-dinitrophenylhydrazone), melting point 327° C. was obtained. These melting points closely corresponded to the values given for the derivatives, 143.5°–145.5° C. and 328° C. respectively, in R. L. Shriner and R. C. Fuson, "The Systematic Identification of Organic Compounds," Wiley and Sons, 1948.

EXAMPLE 2

Cis-dichloroethylene (18.1 g.) and chlorine (14 g.) were reacted in accordance with the procedure of Example 1. Addition required 185 minutes at a temperature range of 10–16° C.

Vapor phase chromatographic analysis and derivative formation in accordance with the previous example again indicated that dichloroacetaldehyde had been obtained. Similarly neither mono- nor trichloroacetaldehyde was formed as a by-product.

We claim:
1. A process for the preparation of dichloroacetaldehyde essentially uncontaminated by monochloro- and trichloroacetaldehyde which comprises hypochlorinating 1,2-dichloroethylene in a dioxane:water medium at a temperature range of about 0°–60° C., employing at least a 1:1 molar ratio of chlorine to 1,2-dichloroethylene.

2. The process of claim 1 wherein the ratio of dioxane to water is 2–3:1 by volume.

3. The process of claim 1 in which a reaction temperature range of 0°–20° C. is employed.

No references ctied.

BERNARD HELFIN, *Primary Examiner.*

R. H. LILES, *Assistant Examiner.*